United States Patent
Gearhart et al.

(10) Patent No.: US 8,918,634 B2
(45) Date of Patent: *Dec. 23, 2014

(54) NETWORK NODE WITH NETWORK-ATTACHED STATELESS SECURITY OFFLOAD DEVICE EMPLOYING OUT-OF-BAND PROCESSING

(75) Inventors: Curtis Matthew Gearhart, Raleigh, NC (US); Christopher Meyer, Raleigh, NC (US); Scott Christopher Moonen, Durham, NC (US); Linwood Hugh Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,577

(22) Filed: Feb. 21, 2012

(65) Prior Publication Data
US 2013/0219168 A1 Aug. 22, 2013

(51) Int. Cl.
*H04L 29/00* (2006.01)

(52) U.S. Cl.
USPC ........... 713/153; 709/238; 709/239; 709/240; 709/241; 709/242; 709/243; 709/244

(58) Field of Classification Search
USPC .................................. 709/238–244
See application file for complete search history.

(56) References Cited

U.S. PATENT DOCUMENTS

| | | | |
|---|---|---|---|
| 6,708,218 B1 | 3/2004 | Ellington | |
| 7,003,118 B1 | 2/2006 | Yang | |
| 7,017,042 B1 | 3/2006 | Ziai | |
| 7,162,630 B2 | 1/2007 | Sperry | |
| 7,194,766 B2 | 3/2007 | Noehring | |
| 7,783,880 B2 | 8/2010 | Pinkerton | |
| 2002/0188839 A1 | 12/2002 | Noehring | |
| 2003/0158906 A1 | 8/2003 | Hayes | |
| 2006/0080728 A1 | 4/2006 | Wen | |

(Continued)

FOREIGN PATENT DOCUMENTS

| | | |
|---|---|---|
| CN | 101222509 A | 7/2008 |
| CN | 201788511 U | 4/2011 |
| JP | 2007135035 A | 5/2007 |

OTHER PUBLICATIONS

PCT International Search Report for International Application No. PCT/IB2013/051061, filed Feb. 8, 2013, mailed Jul. 18, 2013.

(Continued)

*Primary Examiner* — Ghazal Shehni
(74) *Attorney, Agent, or Firm* — Parashos Kalaitzis; Mark P Kahler (57) ABSTRACT

A network node for communicating data packets secured with a security protocol over a communications network includes a host information handling system (IHS) and one or more external security offload devices coupled by a secure data link. The host IHS communicates state information about data packets, and the external offload security device provides stateless secure data encapsulation and decapsulation of packets using a security protocol. An external network interface controller or internal network interface controller communicates encapsulated data packets over the communications network to a final destination. Encapsulation and decapsulation of packets by the external security offload device reduces network latency and reduces the computational load on the processor in the host IHS. Maintaining state information in the host IHS allows hot-swapping of external security offload devices without information loss. The external security offload device may be included in a firewall, or intrusion detection device, and may implement IPsec protocol.

9 Claims, 6 Drawing Sheets

(56) References Cited

U.S. PATENT DOCUMENTS

| | | | |
|---|---|---|---|
| 2006/0104308 A1* | 5/2006 | Pinkerton et al. | 370/469 |
| 2009/0038004 A1 | 2/2009 | Blasko | |
| 2010/0228962 A1* | 9/2010 | Simon et al. | 713/150 |
| 2011/0113236 A1 | 5/2011 | Chenard | |

OTHER PUBLICATIONS

3COM "FIPS 140-2 Security Policy", 3COM, Revision Version 1.03, pp. 1-11, Jun. 18, 2004.

AmesLab—"What is a Cluster Computer?", downloaded from http://www.scl.ameslab.gov/Projects/parallel_cornputing/cluster_basics.html, p. 1-2, downloaded Jan. 4, 2012.

Elliptic—"IPsec Pipelined Offload Engine", www.elliptictech.com, p. 1-2, © 2009.

FreeScale—1322x Network Node Reference Manual, p. 1-46, Rev. 1.5, Nov. 2010.

Friedl—"Steve Friedl's Uniwiz.net Tech Tips", downloaded from http://www.unixwiz.net/techtips/iguide-ipsec.html, p. 1-19, Aug. 24, 2005.

Hacker—IPsec Offload: Meet Microsoft* DirectAccess*, downloaded from http://communities.intel.com/community/openportit/server/blog/2009/05/16/ipsec-offload-meet-microsoft-directaccess, p. 1-2, May 16, 2009.

Javvin—"Information, Computer and Network Security Terms Glossary and Dictionary", downloaded from http://www.javvin.com/networksecurity/vpn.html, pp. 1-3, downloaded Jan. 14, 2012.

Jericho—COA Position Paper Encapsulation & Encryption, downloaded from http://www.opengroup.org/jericho/publications.htm, pp. 1-2, Version 1.0, Oct. 2009.

Leung—"Building a Two-Node Linux Cluster with Heartbeat", Linux Journal, pp. 1-11, Mar. 11, 2002.

Microsoft1—"Windows Network Task Offload", downloaded from http://msdn.microsoft.com/en-us/windows/hardware/gg463469, pp. 1-3, Updated Dec. 4, 2001.

Microsoft2—"IPsec Task Offload Roadmap", WinHEC 2005 Version, pp. 1-15, May 2, 2005.

Microsoft3—"Improving Network Performance by Using IPsec Task Offload", http://technet.microsoft.com/en-us/library/dd125367(WS.10).aspx, p. 1, downloaded Jan. 4, 2012.

Microsoft4—"Managing Security Associations in IPsec Offload Version 2", http://msdn.microsoft.com/en-us/library/windows/hardware/ff557132(v=vs.85).aspx, pp. 1-2, Dec. 8, 2011.

Oracle—"Data Encapsulation and the TCP/IP Protocol Stack", http://docs.oracle.com/cd/E19082-01/819-3000/ipov-32/index.html, pp. 1-3, 2010.

Viking—"The IPSec Offload Solution", http://www.windowsitpro.com/article/performance/the-ipsec-offload-solution, pp. 1-3, May 9, 2000.

Webopedia—"node", http://www.webopedia.com/TERM/N/node.html, p. 1, 2012.

Wiki2—"Stateful firewall", http://en.wikipedia.org/wiki/Stateful_firewall, pp. 1-4, Dec. 24, 2011.

Wiki3—"Network-attached storage", http://en.wikipedia.org/wiki/Network-attached_storage, pp. 1-5, Dec. 21, 2011.

Wiki1—"IPsec", http://en.wikipedia.org/wiki/IPsec, pp. 1-9, Oct. 19, 2011.

Spenneberg—"IPSec HowTo", pp. 1-30, Aug. 18, 2003.

Gearhart—U.S. Appl. No. 13/400,575, filed Feb. 21, 2012, entitled "Network Node With Network-Attached Stateless Security Offload Device Employing In-Band Processing".

Gearhart—U.S. Appl. No. 13/777,931, filed Feb. 26, 2013, entitled "Network Node With Network-Attached Stateless Security Offload Device Employing In-Band Processing".

* cited by examiner

FIG. 1B

NETWORK NODE WITH NETWORK-ATTACHED STATELESS SECURITY OFFLOAD DEVICE EMPLOYING OUT-OF-BAND PROCESSING

BACKGROUND

The disclosures herein relate generally to data security in information handling systems (IHSS), and more specifically, to data security in communications between networked IHSS. Authentication of a source IHS and a destination IHS may increase the security of network communications. Encryption of communications between source and destination IHSS may also increase the security of network communications.

BRIEF SUMMARY

In another embodiment, a network node is disclosed that includes a host information handling system (IHS). The host IHS includes an internal network interface controller. The network node includes a secure data link that couples to the host IHS. The network node also includes a stateless external security offload device that couples to the host IHS via the secure data link. The external security offload device is external to the host IHS. The host IHS is configured to store security metadata that is associated with a data packet. The host IHS is also configured to offload the data packet and associated security metadata via the secure data link to the stateless external security offload device, thus providing an offloaded data packet. The stateless external security offload device is configured to receive the offloaded data packet and associated security metadata. The stateless external security offload device is also configured to encrypt and encapsulate the offloaded data packet thus providing an encapsulated encrypted data packet. The stateless external security offload device is further configured to transmit the encapsulated encrypted data packet back to the host IHS for further processing. The host IHS being is also configured to transmit the encapsulated encrypted data packet via the internal network interface controller of the host IHS to a communications network for communication to an IHS other than the host IHS.

In another embodiment, a network node is disclosed that includes a host information handling system (IHS). The host IHS includes an internal network interface controller. The network node includes a secure data link coupled to the host IHS. The network node also includes a stateless external security offload device that couples to the host IHS via the secure data link. The external security offload device is external to the host IHS. The host IHS is configured to receive a data packet from a communications network via the internal interface controller, thus providing a received data packet. The host IHS is also configured to determine if the received data packet is an encapsulated encrypted data packet that requires security processing. The host IHS is further configured to forward the received data packet to an application in the host IHS for processing if the host IHS determines that the received data packet is not an encapsulated encrypted data packet that requires security processing. The host IHS is still further configured to offload the received data packet via the secure data link to the stateless external security offload device, thus providing an offloaded data packet if the host IHS determines that the received data packet is an encapsulated encrypted data packet that requires security processing. The stateless external security offload device is configured to decapsulate and decrypt the offloaded data packet, thus providing a decapsulated decrypted data packet. The stateless external security offload device is also configured to transmit, via the secure data link, the decapsulated decrypted data packet back to the host IHS for further processing by the application in the host IHS.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In the disclosed network system, a network node includes a host information handling system (IHS) that couples via a secure data link to a stateless external security offload device. The stateless external security offload device couples to an external network interface controller that communicates with one or more other network nodes in the network system. The host IHS offloads security-related tasks to the external security offload device to reduce the security-related workload on the host IHS. For example, the external security offload device may add optional headers to a data packet and/or may apply cryptographic methodology to the data packet on behalf of the host IHS. The host IHS may offload security-related tasks such as encapsulation and decapsulation, encryption and decryption as well as authentication, to an external security offload device that is a network-attached device. In one embodiment, the host IHS may store state information, such as security associations, in a TCP/IP stack of the host IHS rather than in the external security offload device, thus providing a stateless external security offload device rather than a stateful external security offload device.

Figure 1A:
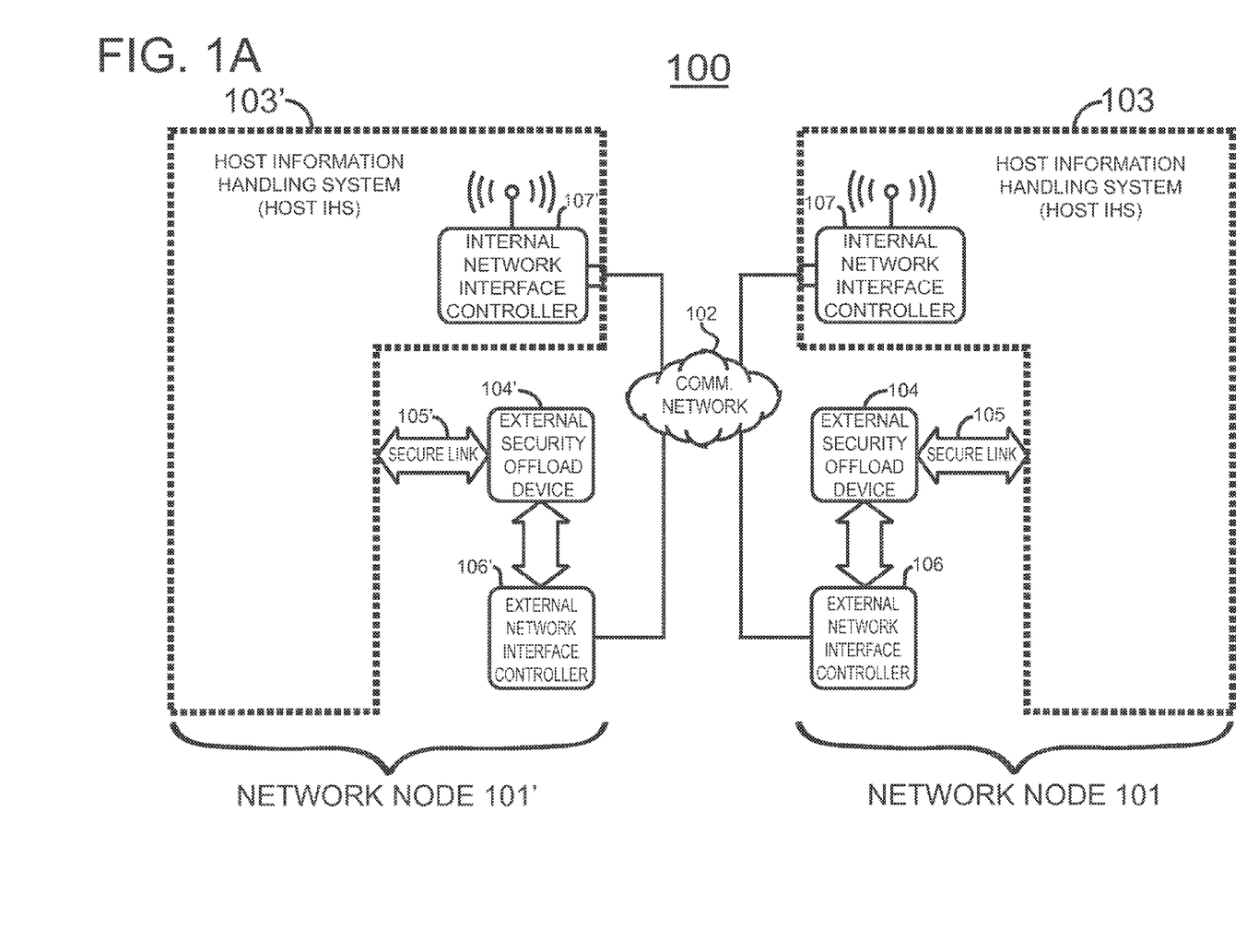
FIG. 1A is a block diagram of the disclosed network system.

FIG. 1A is a block diagram of the disclosed network system 100 that includes multiple network nodes, such as network nodes 101 and 101', that couple together via a communications network 102. Communications network 102 may be virtually any type of communications apparatus including wired and/or wireless links. For example, communications network 102 may include transmission lines, routers, switches, hubs, network fabric, Internet connections, local area networks (LANs) and wide area networks (WANs). Either network node 101 or network node 101' may be the source of a data packet that requires security processing. When network node 101 is the source of a data packet, network node 101' may be the destination of that data packet. Conversely, when network node 101' is the source of a data packet, network node 101 may be the destination of that data packet. Network system 100 may include more network nodes that shown in FIG. 1A.

Network node 101 includes a host IHS 103 with an internal network interface controller 107 that couples host IHS 103 to communications network 102. Network node 101 also includes an external security offload device 104 that couples via a secure data link 105 to host IHS 103. In one embodiment, external security offload device 104 is a "network-attached" device. An external network interface controller 106 couples external security offload device 104 to communication network 102. In one embodiment, external network interface controller 106 couples to external security offload device 104, as shown. In another embodiment, external network interface controller 106 is inside external security offload device 104, but still external to host IHS 103. In a similar manner, network node 101' includes a host IHS 103' with an internal network interface controller 107' that couples host IHS 103' to communications network 102. Network node 101' also includes an external security offload device 104' that couples via a secure data link 105' to host IHS 103'. In one embodiment, external security offload device 104' is a network-attached device. An external network interface controller 106' couples external security offload device 104 to communication network 102.

Figure 1B:
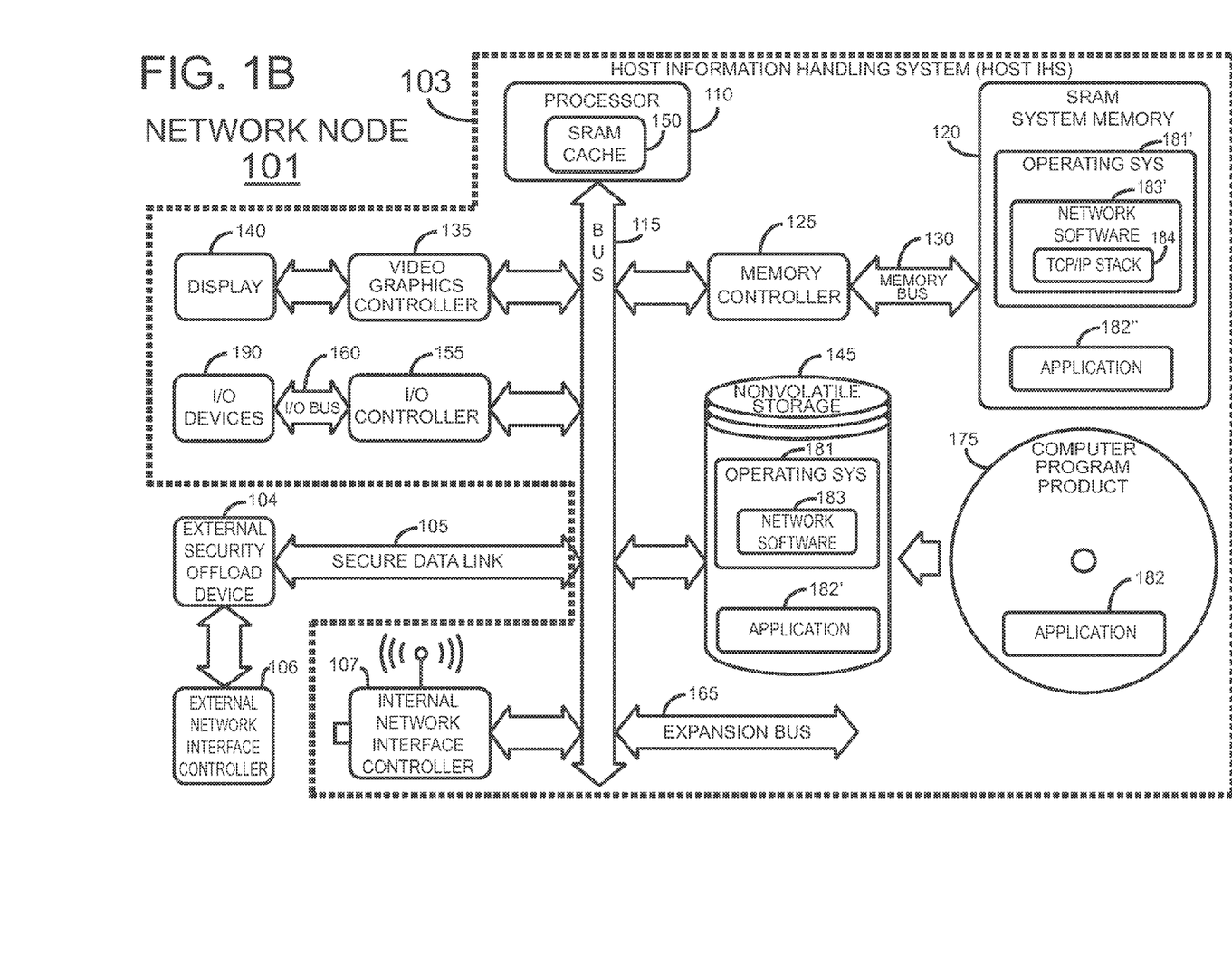
FIG. 1B is a block diagram of a network node that the disclosed network system may employ.

FIG. 1B is a block diagram of a network node 101 that network system 100 may employ as network node 101 and/or network node 101' as well as other network nodes (not shown) of network system 100. In more detail, FIG. 1B shows network node 101 that includes a host information handling system (IHS) 103 that couples to an external security offload device 104 via secure data link 105. Secure data link 105 may prevent unencrypted traffic from being seen or modified by unintended parties. To achieve security, secure data link 105 may employ Open Systems Interconnection (OSI) layer 1 physical isolation, OSI layer 2 encryption, and other OSI layers and/or other security measures. Host IHS 103 includes a processor 110 that may include multiple cores and SRAM cache 150. Host IHS 103 processes, transfers, communicates, modifies, stores or otherwise handles information in digital form, analog form or other form. Host IHS 103 includes a bus 115 that couples processor 110 to system memory 120 via a memory controller 125 and memory bus 130. In one embodiment, system memory 120 is external to processor 110. System memory 120 may be a static random access memory (SRAM) array and/or a dynamic random access memory (DRAM) array. A video graphics controller 135 couples display 140 to bus 115. Nonvolatile storage 145, such as a hard disk drive, CD drive, DVD drive, or other nonvolatile storage couples to bus 115 to provide host IHS 103 with permanent storage of information. I/O devices 190, such as a keyboard and a mouse pointing device, couple to bus 115 via I/O controller 155 and I/O bus 160. One or more expansion busses 165, such as USB, IEEE 1394 bus, ATA, SATA, PCI, PCIE, DVI, HDMI and other expansion busses, couple to bus 115 to facilitate the connection of peripherals and devices to host IHS 103. The dashed line 103 in FIG. 1B indicates host IHS 103 as well as a housing and/or chassis of host IHS 103. In this manner, those structures of host IHS 103 that are inside dashed line 103 are internal to host IHS 103, and those structures of network node 101 that are outside of dashed line 103 are external to host IHS 103.

Host IHS 103 of network node 101 includes an internal network interface controller 107 that couples to bus 115 to enable host IHS 103 to connect by wire or wirelessly to a network such as communications network 102 and other information handling systems and network nodes such as network node 101'. Host IHS 103 may take the form of a desktop, server, portable, laptop, notebook, or other form factor computer or data processing system. Host IHS 103 may take other form factors such as a gaming device, a personal digital assistant (PDA), a portable telephone device, a communication device or other devices that include a processor and memory. Host IHS 103 may also take the form of a portable, laptop, notebook, gaming device, PDA or any battery-powered device. In one embodiment, the performance of host IHS 103 may be especially sensitive to computationally intensive processes that may add to network latency (such as packet security and IPsec processing).

Host IHS 103 may include a computer program product on digital media 175 such as a CD, DVD or other media. In one embodiment, digital media 175 includes an application 182. A user may load application 182 on nonvolatile storage 145 as application 182'. Nonvolatile storage 145 may store an operating system 181 which may include network software 183. When host IHS 103 initializes, the host IHS loads operating system 181 and application 182' into system memory 120 for execution as operating system 181', network software 183' and application 182". Operating system 181', which may include network software 183', governs the operation of host IHS 103. Host IHS 103 couples to the external security offload device 104 through a secure data link 105. The external security offload device 104 couples to an external network interface controller 106. In this manner, external network interface controller 106 is a "network-attached" device. A "network-attached" device acts as a wired and/or wireless portal to a communications network, such as communications network 102, that may interconnect multiple network nodes. For example, external network interface controllers 106 and 106', and internal network interface controllers 107 and 107' serve as wired and/or wireless portals that interconnect network nodes 101 and 101' via communications network 102. Host IHS 103 together with secure data link 105, external security offload device 104 and external network interface controller 106 collectively form a network node 101 for communicating data packets with other network nodes. In one embodiment, host IHS 103 in cooperation with external security offload device 104 may secure these data packets with a security protocol such as the Internet Protocol Security (IPsec) protocol suite.

In one embodiment, at the direction of host IHS 103, the external security offload device 104 of the network node 101 may employ the Internet Protocol Security (IPsec) protocol suite to secure Internet Protocol (IP) communications on behalf of the host IHS 103. External security offload device 104 may be an information handling system that includes a processor (not shown) for facilitating the encapsulation and decapsulation of data packets, for facilitating the encryption and decryption of data packets, for authentication of data packets, and for optionally performing firewall and intrusion detection services (IDSs) and other optional services on data packets. External security offload device 104 may also include memory (not shown) and storage (not shown).

External security offload device 104 may employ a security protocol that authenticates IP data packets and encapsulates the authenticated IP data packets. After encapsulating an authenticated IP data packet, the security protocol may encrypt the encapsulated IP data packet. For example, the IPsec protocol authenticates and encrypts each IP data packet of a communication session. IPsec also includes protocols for establishing mutual authentication between agents at the beginning of the communication session and for negotiation of cryptographic keys for use during the communication session. Host IHS 103 and host IHS 103' are examples of such agents. More specifically, the portion of network software 183 that provides security is an agent that may act at the direction of a human security administrator. In one embodiment, the external security offload device 104 may provide all IPsec encapsulation and decapsulation operations, as well as encryption, decryption and authentication, for the network node 101. This reduces the security-related workload of the host IHS 103 in the network node 101.

A security policy is a rule that a designer, programmer or other entity programs into a security protocol, such as the IPSec protocol, that instructs the protocol how to process data packets that a particular device receives. For example, a security policy may decide whether or not a particular data packet requires IPsec protocol security processing. Those data packets that do not require security processing may bypass Authentication Header (AH) protocol processing or Encapsulating Security Payload (ESP) protocol processing. If the device determines that a particular data packet requires security protocol processing, then a security policy may instruct the device with guidelines for handling security for that data packet. In one embodiment, a device such as host IHS 103 and/or external security offload device 104 may store security policies in a security policy database (not shown) within such devices. Security Association (SA) information is a set of security information that describes a particular type of secure connection between two devices. The SA information includes the particular security mechanisms that two devices may employ to securely communicate with one another.

In one embodiment, external security offload device 104 operates as a network-attached device. A network-attached device may be an information handling system (IHS) that connects to a network and provides file-based storage services and/or other specialized services. In one embodiment, external security offload device 104 provides the specialized security-related services of encapsulation, decapsulation, encryption, decryption and authentication.

In one embodiment of the disclosed network system 100, a TCP/IP stack 184 of the network software 183' in the operating system 181' of the host IHS 103, rather than the external security offload device 104, maintains all of the IPsec security associations (SA) state information. This arrangement enables the external security offload device 104 to be a stateless device. Some embodiments may integrate the external security offload device 104 with other network services, for example firewall services, intrusion detection services, and deep packet inspection services for unencrypted data that also pass through the external security offload device of the network node. In one embodiment, the physical separation between the external security offload device 104 and the host IHS 103 of the network node 101, and the stateless nature of the external security offload device 104 facilitates (1) "hot swapping" or replacement of the external security offload device 104 with minimum system interference or disruption, and (2) enables the configuration of multiple external security offload devices for load balancing or hot-standby without the complications of state synchronization, and further (3) enables dynamic enabling and disabling of the external security offload devices for system maintenance or for multi-homed hosts. A multi-homed host includes multiple network connections. A multi-homed host may connect to multiple networks or the same network.

One embodiment of the disclosed network system 100 off-loads security processing from the host IHS 103 to the external security offload device 104 of the network node 101. The TCP/IP stack 184 of the network software 183' in the operating system 181' of the host IHS 103 maintains state information. The network software 183' in the operating system 181' of the host IHS 103 communicates a selection of outbound metadata for the IP data packets to the external security offload device 104. Outbound metadata may include information about the IP data packets that network software 183' of the host IHS 103 transmits to external security offload device 104. Outbound metadata may include IPsec security association (SA) information and the relevant SA state information that applies to the IP data packet. Security association (SA) information refers to negotiated SA attributes such as the specification of which network traffic is allowed to use a tunnel (for example, IPsec can limit this to particular network addresses or protocols), choice of cryptographic algorithms for authentication, encryption and decryption; the cryptographic keys used for these algorithms; and the method for encapsulating data. For example, IPsec allows for tunnel and transport modes of encapsulation. SA state information refers to attributes of the SA that change over its lifetime, such as counters used for replay protection, or counters used to limit the amount of data protected by the SA. The network software 183' of the IHS operating system 181' may attach outbound metadata to IP data packets by inserting internet protocol (IP) headers into the IP data packets, and may send the IP data packets and outbound metadata to the external security offload device 104, or the network software 183' may send special purpose Ethernet frames to communicate the IP packet data and the outbound metadata to the external security offload device 104.

In one embodiment, networking software 103' includes SA policy rules that govern the encapsulation of IP data packets using a security protocol such as the IPsec protocol. Other embodiments may use other security protocols. In one embodiment, the TCP/IP stack 184 in the host IHS 103 sends IP data packets to an external security offload device 104. The SA policy rules of the network software 183' in the operating system 181' of the host IHS 103 determine the rules governing encapsulation of packets using IPsec. The network software 183' implementing the TCP/IP stack 184 chooses the appropriate IPsec SA to use for encapsulating the data packet. The corresponding necessary outbound metadata may include the security parameter index (SPI) and the protocol of a tunnel, that is, the specific protocol that the tunnel uses for data transfer, for example: Authentication Header (AH) protocol or Encapsulating Security Payload (ESP) protocol. The outbound metadata may also include an IPsec sequence number that the TCP/IP stack 184 chooses for external security offload device 104 to use when external security offload device 104 encapsulates a IP data packet.

In another embodiment, the external security offload device 104 sends a responsive encrypted, encapsulated IPsec data packet back to the TCP/IP stack 184 in the network software 183' of the host IHS 103 for transmission over the communications network 102 to a final destination using an internal network interface controller 107. External security offload device 104 may send inbound metadata back to TCP/IP stack 184 in response to IP data packet encapsulation and/or encryption requests that external security offload device receives from TCP/IP stack 184. The inbound metadata may include a result code to signify the success or failure of an encapsulation operation.

In yet another embodiment, the TCP/IP stack 184 in the network software 183' of the host IHS 103 sends an IPsec packet to an external security offload device 104 for decryption and decapsulation. TCP/IP stack 184 may send outbound metadata along with the encapsulated data packet that requires decapsulation. The outbound metadata may include selection information that instructs external security offload device 104 to conduct a decapsulation operation.

In still another embodiment, the external security offload device 104 sends a decapsulated packet back to the TCP/IP stack 184 in the network software 183' of the host IHS 103 for inbound data packet processing. Along with the decapsulated data packet, external offload security device 104 may send inbound metadata to TCP/IP pack 184. The inbound metadata may include the SPI and protocol, AH or ESP of the tunnel that communications network 102 used to transport the data packets so that the TCP/IP stack 184 may check which SA that the external security offload device 104 used against the TCP/IP policy rules for the data packet. The metadata may also include the IP sec replay sequence number that TCP IP stack 184 observes for the packet. The TCP/IP stack 184 may perform a final stateful check to verify if a data packet is "replayed" and therefore invalid.

In summary, the metadata information which may exchange between the TCP/IP stack 184 in the network software 183' of the operating system 181' in the host IHS 103 and the external security offload device 104 may include the selection or indication of the performed operation, such as encapsulate, encapsulated, decapsulate, decapsulated. The metadata may include key information such as a result code, if applicable, for the operation, and the selection or indication of the tunnel protocol and SPI. The key information may also include the selection or indication of the packet replay sequence number. The packet replay sequence number is the state information that allows the external security offload device to operate in a stateless manner.

TABLE 1 below shows an example inbound or outbound IP option header including key information (metadata) that the TCP/IP stack 184 of the network software 183' of the operating system 181' in the host IHS 103 and the external security offload device 104 may exchange. The fields include the 'option type' ipo_typ, and the 'option length' ipo_len which are each one byte in length. The 1 byte long 'flow function code' ipo_secoff_function may indicate #1—decapsulate, #2—decapsulated, #3—encapsulate, or #4—encapsulated. The 1 byte long ipo_secoff_rc indicates the 'return code' for flows #1 or #4. The 'primary protocol' field may be 1 byte long ipo_decoff_protocol. For flows #2 or #3 ipo_decoff_protocol indicates the protocol pertaining to the SPI. For example, either AH or ESP SPI may be specified for a tunnel that may use both AH and ESP. Table 1 reserves the 3 byte ipo_secoff_rsvd field for future use. The 4 byte long field ipo_secoff_spi identifies the local SPI in the original inbound packet for flow #2, or the remote SPI to be used for the outbound packet in flow #3. The 4 byte long ipo_secoff_seq field may be the sequence number in the original inbound packet for flow #2, or the sequence number that the metadata specifies for the outbound packet for flow #3. Both the AH and ESP headers should use the value of ipo_secoff_seq provided for flow #3 if both protocols AH and ESP are in use.

TABLE 1

IP option header for communicating IPsec metadata

| Field | Offset | Length | Description |
|---|---|---|---|
| ipo_typ | 0 | 1 byte | option type |
| ipo_len | 1 | 1 byte | option length |
| ipol_secoff_function | 2 | 1 byte | Flow function code:<br>#1—decapsulate (host to external device)<br>#2—decapsulated (external device to host)<br>#3—encapsulate (host to external device)<br>#4—encapsulated (external device to host) |
| ipo_secoff_rc | 3 | 1 byte | Return code for flows #1 or #4 |
| ipo_secoff_protocol | 4 | 1 byte | Primary protocol |
| ipo_secoff_rsvd | 5 | 3 bytes | Reserved for future use |
| ipo_secoff_spi | 8 | 4 bytes | for flow #2: SPI in original inbound packet<br>for flow #3: SPI for outbound packet |
| ipo_secoff_seq | 12 | 4 bytes | for flow #2: sequence number in original inbound packet<br>for flow #3: sequence number for outbound packet |

Figure 2:
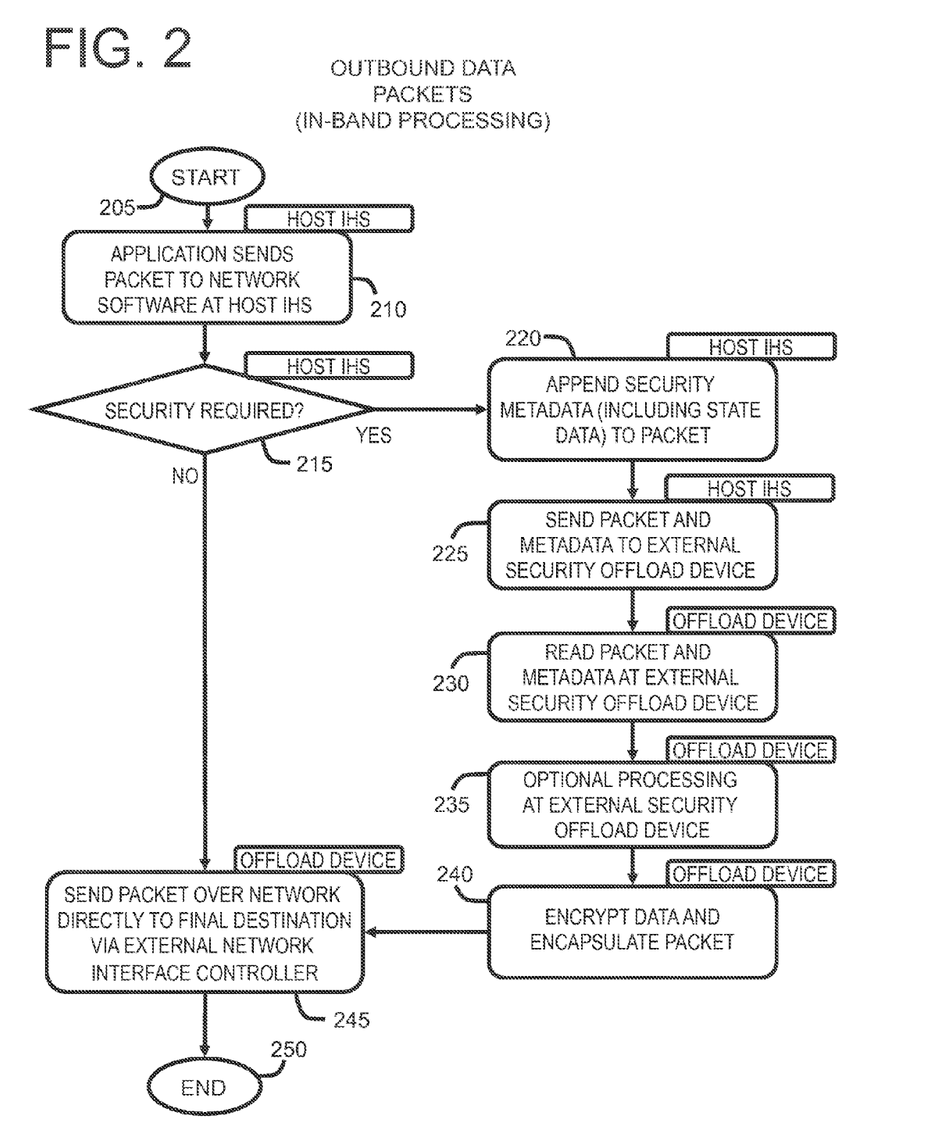
FIG. 2 is a flow chart that depicts one method of processing outbound data packets with an external security offload device at a network node.
Figure 3:
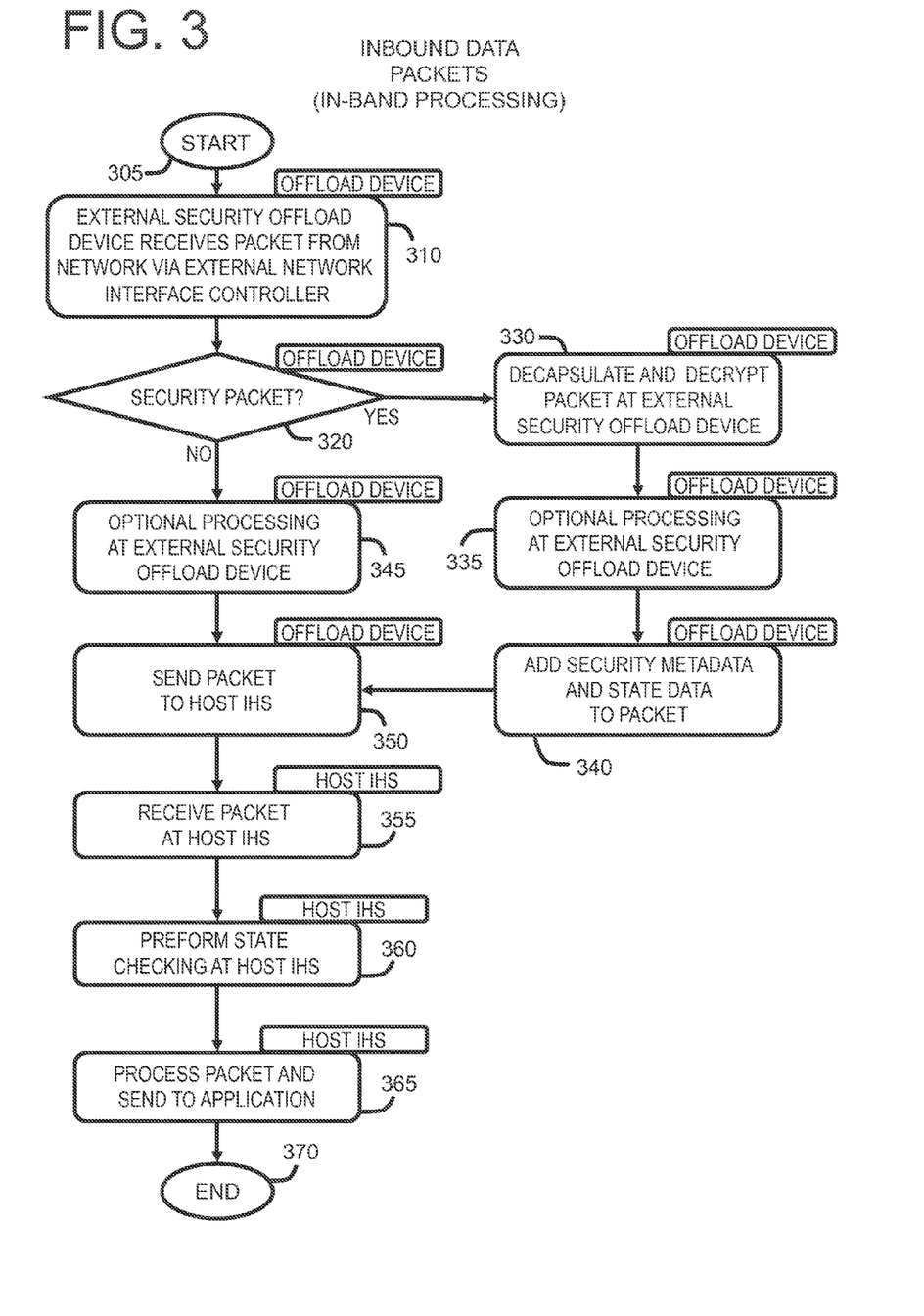
FIG. 3 is a flow chart that depicts one method of processing inbound data packets with an external security offload device at a network node.
Figure 4:
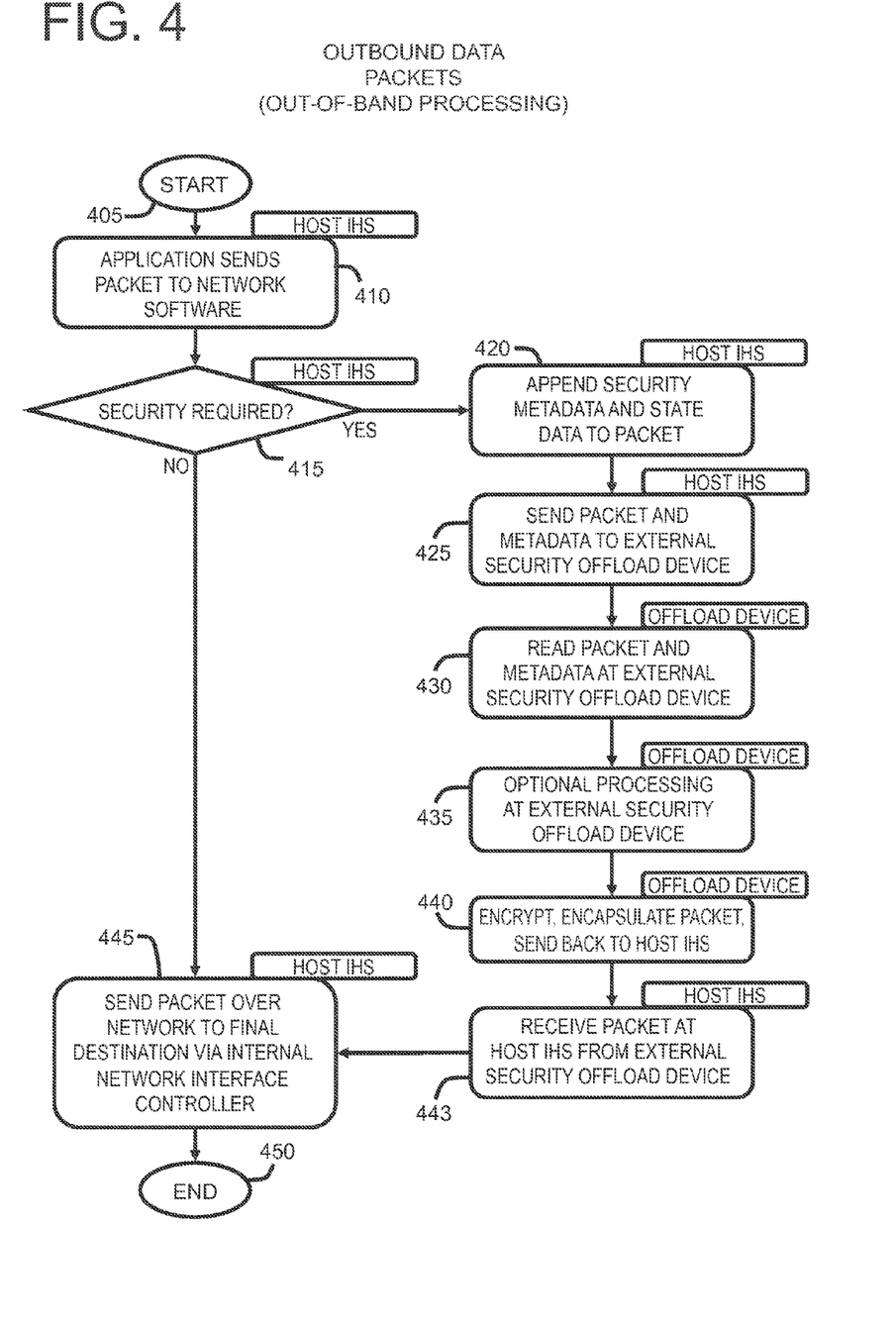
FIG. 4 is a flow chart that depicts another method of processing outbound data packets with an external security offload device at a network node.
Figure 5:
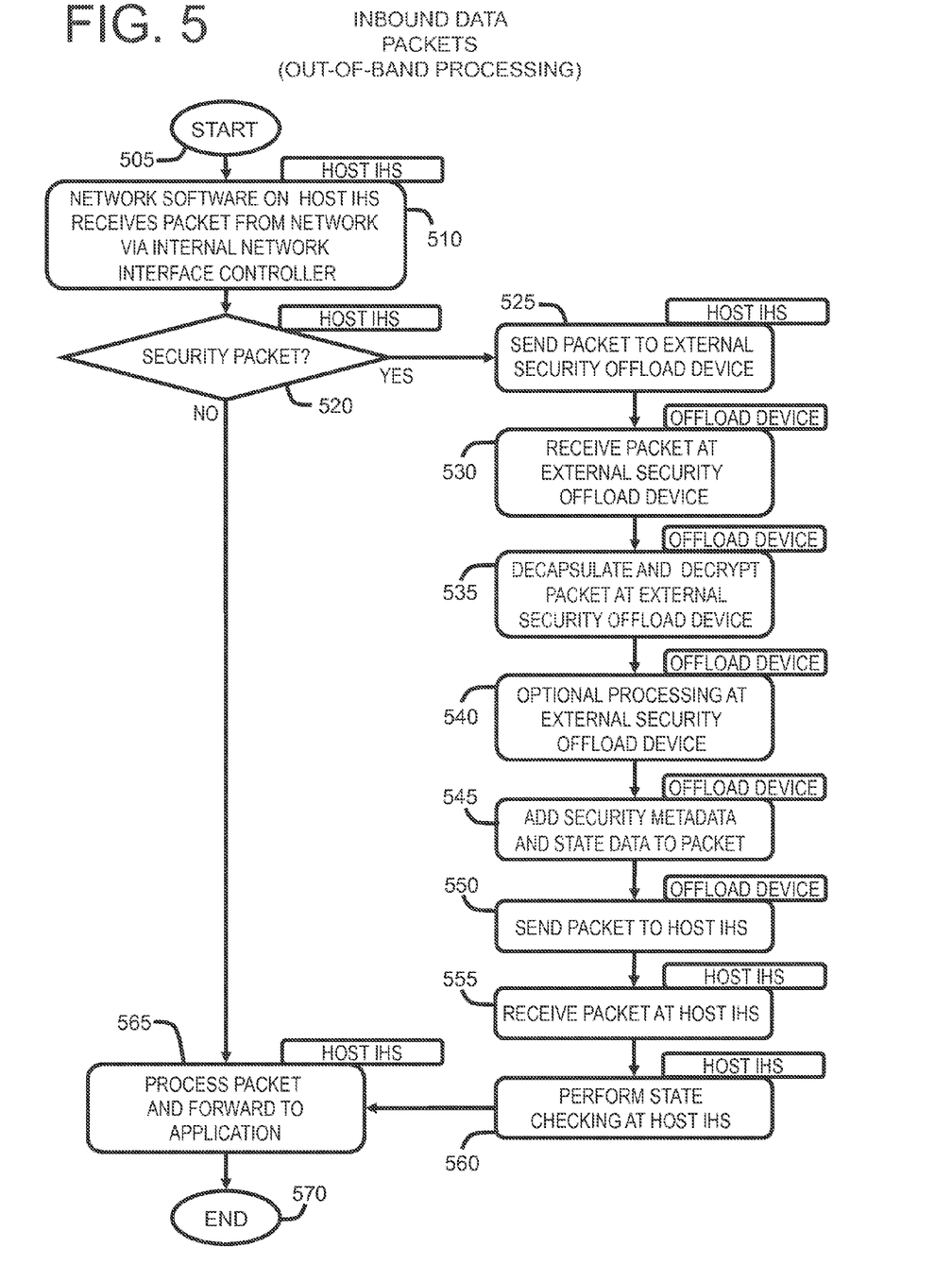
FIG. 5 is a flow chart that depicts another method of processing inbound data packets with an external security offload device at a network node.

FIGS. 2 and 3 are flow charts that describe embodiments of "in-band" processing that a network switch, router, firewall or intrusion detection device may perform when serving as a gateway or gate keeper for data traffic flowing to the TCP/IP stack 184 in the network software of the operating system in the host IHS. "In-band" processing takes place within external security offload device 104. The "in-band" processing may encapsulate and encrypt packets for the external security offload device 104 to send directly to the final network destination without needing to send the packets back to the TCP/IP stack 184, and may decapsulate incoming data packets for immediate processing by the external security offload device before passing the packets back to the TCP/IP stack 184. FIGS. 4 and 5 described below show embodiments of "out-of-band" processing wherein all data packets pass from the TCP/IP stack 184 to the external security offload device 104 for encryption/encapsulation or decapsulation/decryption and then back to the TCP/IP stack 184 for final processing. "Out-of-band" processing is processing that is done outside of external security offload device 104. Out-of-band processing may involve another trip between external security offload device and host IHS 103.

The flow chart of FIG. 2 describes one embodiment of the disclosed method of applying a data security protocol to an outbound data packet at the stateless external security offload device 104. Outbound data packets are those data packets that host 103 of network node 101 transmits to other network nodes. In addition to providing data security protocol operations to an outbound data packet on behalf of host IHS 103, external security offload device 104 may perform other networking functions such as providing a firewall and/or intrusion detection services (IDSs) as well as data security protocol operations. External security offload device 104 provides "in-band" processing of outbound data packets by performing security operations on outbound data packets and sending these outbound packets to a destination node without the necessity of returning such data packets to host IHS 104 for further security processing. For simplicity, the flowchart of FIG. 2 refers to stateless external offload device 104 as "offload device". Each block in the flowchart of FIG. 2 includes a descriptor such as "offload device" or "host IHS" to identify the structure that performs the function of the respective block in one embodiment.

In more detail, process flow commences at start block 205. Application 182" in host IHS 103 sends a data packet to the network software 183' of host IHS 103 operating system 181', as per block 210. If network transmission of the data packet does not require security processing, as per decision block 215, the network software 183' in the host IHS 103 operating system 181' sends the data packet over the network to the external security offload device 104, and directly via the external network interface controller 106 to a final destination network node, as per block 245, and process flow ends with block 250.

However, if network software 183' of operating system 181' determines at decision block 215 that network transmission requires application of a data security protocol, then network software 183' may apply security metadata and state data to the data packet according to flow #3 of TABLE 1, as per block 220. Such metadata is outbound metadata. The network software 183' of operating system 181' sends the metadata and data packet over network secure data link 105 to external security offload device 104, as per block 225. External security offload device 104 receives and reads the data packet and corresponding metadata, including state data, as per block 230. External security offload device 104 may perform optional processing such as firewall services and/or intrusion detection services (IDS) on the data packet, as per block 235, and encrypts and encapsulates the data packet, as per block 240. External security offload device 104 sends the encapsulated encrypted data packet directly to the final destination network node over the network, as per block 245, via external network interface controller 106. Process flow ends with block 250.

The flow chart of FIG. 3 describes one embodiment of the disclosed method of receiving inbound data packets from a network via external security offload device 104. Inbound data packets are those data packets that host IHS 103 of network node 101 receives from other network nodes. External security offload device 104 receives inbound data packets and provides "in-band" processing of inbound data packets by performing security operations on inbound data packets without the necessity of returning such data packets to host IHS 103 for further security processing. In one embodiment, external security offload device 104 sends decapsulated decrypted data packets to host IHS 103, but host IHS 103 need not perform other security operations on these data packets. Rather, an application in host IHS 103 may directly use the decapsulated decrypted data packets that host IHS 103 receives from external security offload device 104.

In more detail, process flow commences with start block 305. External security offload device 104 receives a data packet from the network via external network interface controller 106, as per block 310. External security offload device 104 performs a test to determine if the data packet requires security processing, as per decision block 320. To determine if the data packet requires security processing, external security offload device 104 checks static security policy and SA information that external security offload device 104 receives from host IHS 103. It is noted that SA state information may still reside in network software 183' of host IHS 103. If external security offload device 104 determines that the packet does not require security processing, then external security offload device 104 may perform optional processing such as providing firewall services and/or IDS services, as per block 345, and sends the data packet to the host IHS 103 via secure data link 105, as per block 350.

However, if the packet requires security processing, then external security offload device 104 decapsulates and decrypts the packet, as per block 330, and performs optional processing such as firewall and/or IDS or other optional processing, as per block 335. External security offload device 104 may add inbound metadata, including state data, according to flow #2 of TABLE 1 as per block 340, and sends the data packet to host IHS 103 via secure data link 105 as per block 350. Network software 183' in operating system 181' of host IHS 103 receives the data packet from external security offload device 104 as per block 355, and performs state checking, as per block 360. Network software 183' in operating system 181' processes the data packet and forwards the data packet to application 182', as per block 365. Process flow ends with block 370.

The flow chart of FIG. 4 describes another embodiment of the disclosed method of applying security to an outbound data packet at a external security offload device 104 on behalf of host IHS 103. This embodiment employs "out-of-band" processing for handling those data packets that require security operations such as encryption and encapsulation. In such out-of-band processing, stateless external security offload device 104 handles security operations such as encrypting and encapsulating a data packet that stateless external security offload device 104 receives from host IHS 103 for security processing. However, stateless external security offload device 104 sends the resultant encapsulated encrypted data packet back to host IHS 104 for transmission to the destination of that data packet. External security offload device 104 may also perform other networking functions such providing a firewall or IDS.

In more detail, process flow commences at start block 405. Application 182" in host IHS 103 sends a data packet to network software 183' of host IHS 103 operating system 181', as per block 410. Network software 183' performs a test to determine if network transmission of the data packet requires application of a security protocol to the data packet, as per decision block 415. Network software 183' makes this determination by referencing security policy. The application software 182" may instruct the TCP/IP stack 184 of network software 183' to initiate the decision for applying a security protocol to the data packet. If the network software 183' determines that the data packet does not require application of a security protocol, then external security offload device 104 transfers the packet via internal network interface controller 107 directly to a final destination network node, as per block 445. Process flow ends with block 450.

However, if network transmission requires application of security to the data packet, network software 183' in operating system 181' may apply metadata and state data according to flow #3 in TABLE 1, as per block 420. Such metadata is outbound metadata. The network software 183' of host IHS 103 operating system 181' sends the metadata and data packet over network secure data link 105 to external security offload device 104, as per block 425. External security offload device 104 receives and reads the data packet and metadata, as per block 430. External security offload device 104 may also perform optional processing such as firewall processing and/or IDS, as per block 435. The external security offload device 104 encapsulates and encrypts the data packet and sends the encrypted encapsulated data packet over secure data link 105 back to the networking software 183' in operating system 181', as per block 440. Network software 183' in operating system 181' receives the encapsulated packet, as per block 443. Network software 183' sends the encapsulated data packet via internal network interface controller 107 to the final destination network node via the communications network 102, as per block 445. The process flow ends with block 450.

The flow chart of FIG. 5 describes another embodiment of the disclosed method of receiving data packets from a network via internal network interface controller 107. This embodiment employs "out-of-band" processing for handling those inbound data packets that require security operations such as decapsulation and decryption. Inbound data packets are those data packets that host IHS 103 receives from other network nodes. In out-of-band processing, stateless external security offload device 104 handles security operations such as encrypting and encapsulating a data packet that stateless external security offload device 104 receives from host IHS 103 for security processing. However, stateless external security offload device 104 sends the resultant encapsulated encrypted data pack back to host IHS 104 for transmission to the destination of that data packet.

In more detail, process flow commences with start block 505. Network software 183' in operating system 181' receives a data packet from internal network interface controller 107, as per block 510. This received data packet is an inbound data packet that host IHS 103 of network node 101 receives from another network node. Network software 183' performs a test to determine if the data packet requires security processing, as per decision block 520. If the data packet does not require security processing, then the network software 183' in operating system 181' processes the data packet and forwards the data packet to application 182", as per block 565. The process flow terminates with block 570.

However, if the data packet requires security processing, then the network software 183' in operating system 181' sends the data packet over secure data link 105 to external security offload device 104, as per block 525. External security offload device 104 receives the packet, as per block 530 and decapsulates and decrypts the packet as per block 535. External security offload device 104 may optionally perform firewall processing and/or IDS or other services, as per block 540. External security offload device 104 may add security metadata including state data to the packet according to flow #3 of TABLE 1, as per block 545. The external security offload device 104 sends the decapsulated, decrypted data packet back via the secure data link 105 back to the network software 183' in operating system 181', as per block 550. The network software 183' in operating system 181' receives the decapsulated, decrypted data packet from the external security offload device 104, as per block 555 and performs a state check as per block 560. The network software 183' in host IHS 103 then processes the data packet and forwards the data packet to application 182", as per block 565. This processing of the data packet by network software 183' may involve protocol and consistency checks prior to presentation of the data packet to application 182". The process flow ends with block 570.

For the inbound in-band embodiment of FIG. 3, the external security offload device 104 stores a copy of static SA information so that external security offload device 104 may decide on its own whether or not a security packet requires security processing. In all four embodiments, namely the outbound in-band embodiment of FIG. 2, the inbound in-band embodiment of FIG. 3, the outbound out-of-band embodiment of FIG. 4, and the inbound out-of-band embodiment of FIG. 5, the external security offload device 104 may store SA information. However, the inbound in-band embodiment of FIG. 3 may require that the security offload device 104 store unchanging SA information, i.e. static SA information, so that external security offload device 104 may decide on its own whether or not a security packet requires security processing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, blocks, operations, elements, and/or components, but do not preclude the presence or addition of one or more other features, integers, steps, blocks, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, those skilled in the art will appreciate that the logic sense (logic high (1), logic low (0)) of the apparatus and methods described herein may be reversed and still achieve equivalent results. The embodiment was chosen and described in order to best explain the principles of the invention and the practical application, and to enable others of ordinary skill in the art to understand the invention for various embodiments with various modifications as are suited to the particular use contemplated.

We claim:

1. A network node, comprising:
a host information handling system (IHS) including an internal network interface controller;
a secure data link coupled to the host IHS;
a stateless network-attached external security offload device, coupled to the host IHS via the secure data link, the stateless network-attached external security offload device being external to the host IHS; and
the host IHS being configured to store security metadata that is associated with a data packet, the host IHS being further configured to offload the data packet and the associated security metadata and static security association (SA) information via the secure data link to the stateless network-attached external security offload device, thus providing an offloaded data packet;
the stateless network-attached external security offload device being configured to:
receive the offloaded data packet and the associated security metadata and the static security association (SA) information;
store the offloaded data packet and the static security association (SA) information;
encrypt and encapsulate the offloaded data packet thus providing an encapsulated encrypted data packet; and
transmit the encapsulated encrypted data packet back to the host IHS for further processing;
the host IHS being further configured to:
transmit the encapsulated encrypted data packet via the internal network interface controller of the host IHS to a communications network for communication to an IHS other than the host IHS.

2. The network node of claim 1, wherein the stateless network-attached external security offload device employs IPsec protocol.

3. The network node of claim 1, wherein the security metadata includes state data.

4. The network node of claim 1, wherein the encrypting and encapsulating of the data packet is performed by the stateless network-attached external security offload device as instructed by the associated security metadata that the stateless network-attached external security offload device receives from the host IHS.

5. A network node, comprising:
- a host information handling system (IHS) including an internal network interface controller;
- a secure data link coupled to the host IHS;
- a stateless network-attached external security offload device, coupled to the host IHS via the secure data link, the stateless network-attached external security offload device being external to the host IHS; and
- the host IHS being configured to:
  - receive a data packet from a communications network via the internal interface controller, thus providing a received data packet;
  - determine if the received data packet is an encapsulated encrypted data packet that requires security processing;
  - forward the received data packet to an application in the host IHS for processing if the host IHS determines that the received data packet is not the encapsulated encrypted data packet that requires security processing;
  - offload the received data packet and static security association (SA) information via the secure data link to the stateless network-attached external security offload device, thus providing an offloaded data packet and static security association (SA) information if the host IHS determines that the received data packet is the encapsulated encrypted data packet that requires security processing;
- the stateless network-attached external security offload device being configured to:
  - receive the offloaded data packet and the static security association (SA) information;
  - store the offloaded data packet and the static security association (SA) information;
  - decapsulate and decrypt the offloaded data packet, thus providing a decapsulated decrypted data packet; and
  - transmit, via the secure data link, the decapsulated decrypted data packet back to the host IHS for further processing by the application in the host IHS.

6. The network node of claim 5, wherein the stateless network-attached external security offload device employs IPsec protocol.

7. The network node of claim 5, wherein the stateless network-attached external security offload device is further configured to add security metadata to the decapsulated decrypted data packet.

8. The network node of claim 5, wherein the host IHS is further configured to performing state checking for the decapsulated decrypted data packet.

9. The network node of claim 5, wherein the stateless network-attached external security offload device is further configured to provide at least one of firewall services and intrusion detection services.

\* \* \* \* \*